Inventor.
Charlie H Lovelace
By Joseph O. Lange
Atty.

March 10, 1964  C. H. LOVELACE  3,124,153
FLANGED VENTURI ENDS WITH RECESSED LINE DRAINS
Filed April 19, 1962  3 Sheets-Sheet 2
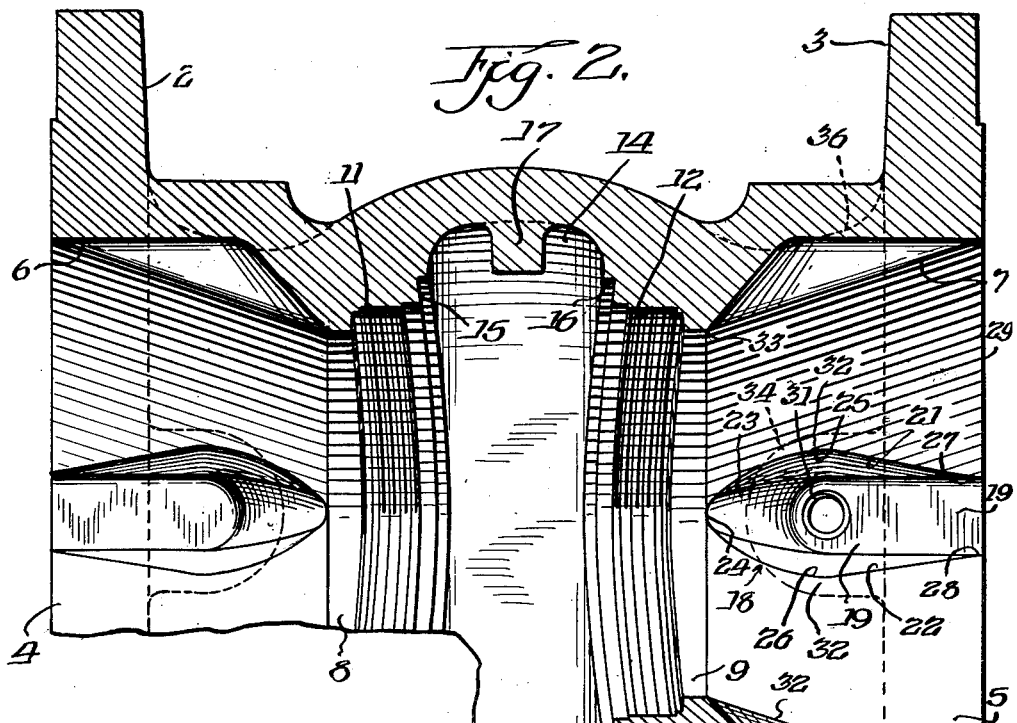
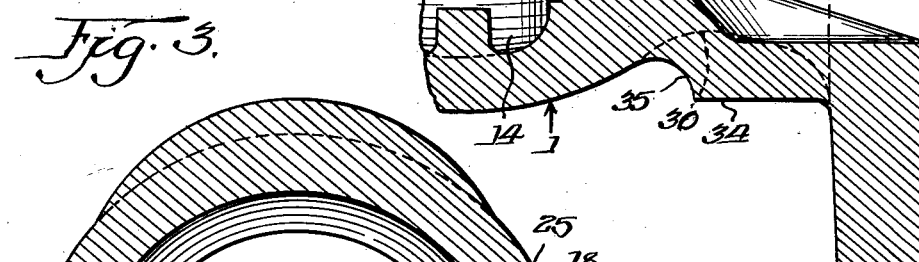
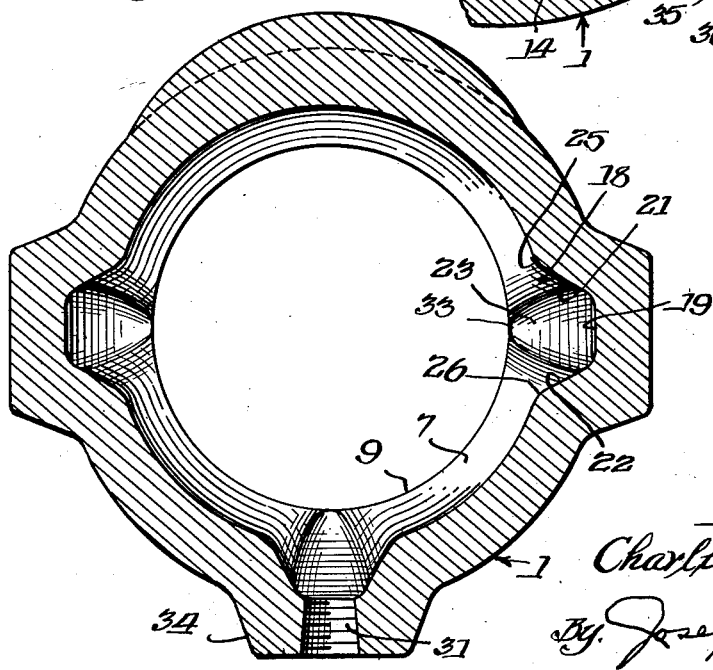
Inventor.
Charlie H. Lovelace.
By Joseph O. Lange
Atty.

March 10, 1964     C. H. LOVELACE     3,124,153
FLANGED VENTURI ENDS WITH RECESSES LINE DRAINS
Filed April 19, 1962     3 Sheets-Sheet 3
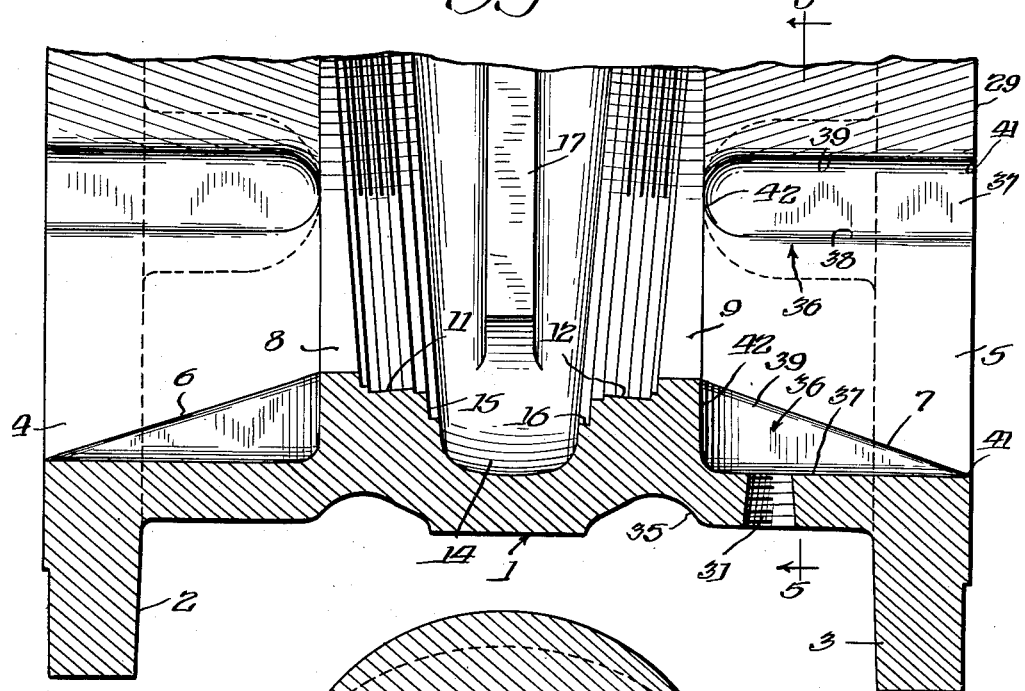
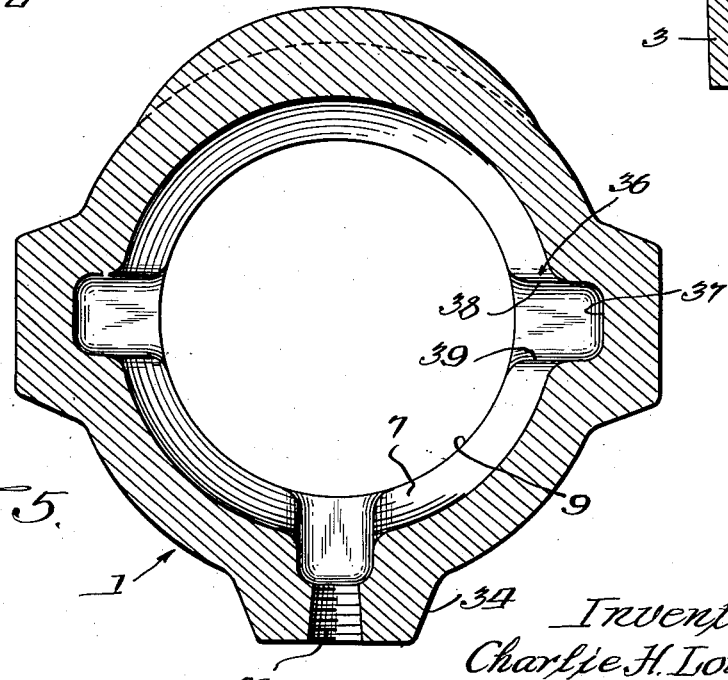
Inventor.
Charlie H. Lovelace.
By Joseph O. Lange
Atty.

United States Patent Office 3,124,153
Patented Mar. 10, 1964

3,124,153
FLANGED VENTURI ENDS WITH RECESSED
LINE DRAINS
Charlie H. Lovelace, Glen Ellyn, Ill., assignor to Crane Co., Chicago, Ill., a corporation of Illinois
Filed Apr. 19, 1962, Ser. No. 188,791
8 Claims. (Cl. 137—312)

This invention relates broadly to improvements in flow control and flow conveying devices, such as valves, fittings, and similar flow advancing means.

More specifically, it is directed to a novel form of pressure vessel in which in order to expedite line flow therethrough, the casing of said pressure vessel, whether it be a valve or a fitting or the like, is provided with inlet and outlet ports, at least one of which is formed with a venturi or venturi-like port configuration.

In devices of this kind, it frequently becomes desirable to use in combination therewith drain means or bleeds so that the said vessel may be suitably drained or relieved of condensate or other constituents in the line fluid, for example, depending upon the nature or character of the service for which said pressure vessel is installed.

In order to acquire a better appreciation of the problem solved by this invention, it should be understood at the outset that such venturi passages for proper functioning should have a minimum of interference from the drain line installed insofar as fluid flow and freedom from turbulence in the vessel is concerned.

Therefore, it is one of the more important objects of this invention to provide as a modification in the usual venturi-like passage a novel form of surface preferably relieved in a particular manner, cooperating with the venturi port, thereby to minimize such impediment to line flow or creation of turbulence as heretofore encountered in the field.

It is one of the more important objects of this invention to provide such device conveniently without expensive and substantial changes in the casing employing the drain means and also permitting such a high degree of flexibility with respect to the installation of the drain means required that it is easily done by not only the manufacturer, but the draining may easily be completed in the field without requiring costly equipment or tools.

Another important object of the invention is to provide for a suitably relieved surface in the inner wall defining the venturi port of the pressure vessel which surface is so formed and so arranged with respect to the venturi port that it presents no serious problem in the manufacture or provision for such drain means in cooperation with said venturi port or passage.

Other objects and advantages will become more readily apparent upon proceeding with the following description read in light of the accompanying drawings in which:

FIG. 2 is a sectional assembly view taken on the line 2—2 of FIG. 1;

FIG. 3 is a transverse sectional view taken on the line 3—3 of FIG. 1;

FIG. 4 is a fragmentary sectional view of a valve body embodying a modified form of my invention;

FIG. 5 is a sectional view taken on the line 5—5 of FIG. 4.

Similar reference numerals refer to similar parts throughout the several views.

Figure 1:
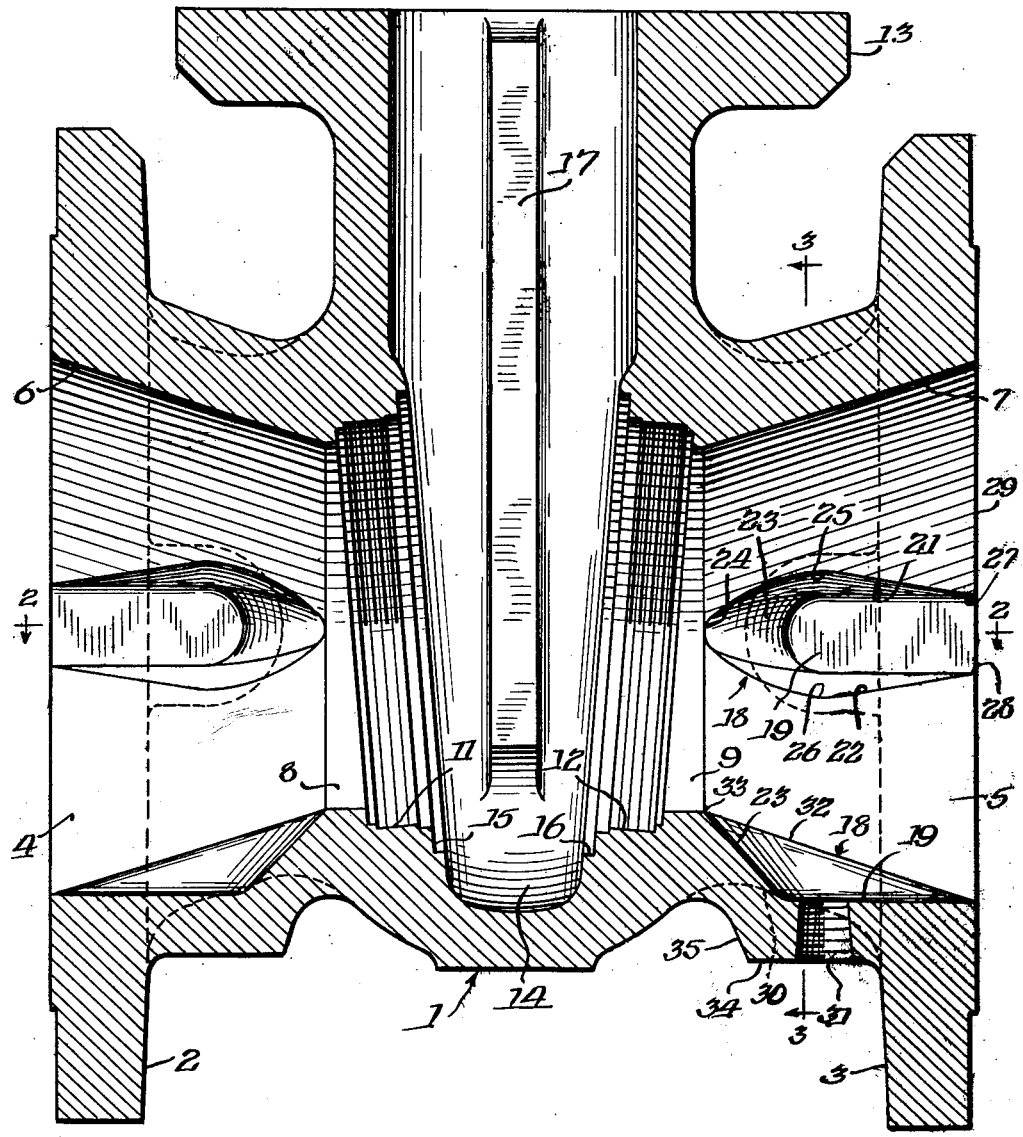
FIG. 1 is a sectional view of a valve body or casing employing the combined venturi and drain means of my invention.

Referring now to FIG. 1, for purpose of illustration, a conventional valve body generally designated 1 is shown having the usual end flanges 2 and 3 for effecting the conventional attachment to a pipe line (not shown). While specific mention has been made here to the employment of valve flanges as at 2 and 3 for such attachment, it will be understood that the flanges may be dispensed with and welding ends for example and other forms of connecting means may be employed without affecting the scope or breadth of this invention. The valve body illustrated is the usual gate valve, having the ports 4 and 5, which, as illustrated, are bound by annular sloping surfaces 6 and 7 forming a venturi passage which may be broadly termed of frusto-conical configuration. The inner portion of the frusto-conical ports 6 and 7 terminate with their joining the ports 8 and 9. The latter ports communicate with the usual threaded recess 11 and 12 for retention of the usual body seat rings (not shown).

It will be noted that the ported portions 8, 9, 11, 12, 15 and 16 thus constitute the inner limits defining an annular rib separating the relieved portions 18 from the valve chamber 14.

At the upper end of the valve casing 1, the usual bonnet flange 13 is provided for attachment to the valve bonnet (not shown) for journalling the usual actuating means (also not illustrated). It will be noted that the inner valve chamber 14 at its lower portion is annularly tapered at at 15 and 16 to receive the usual body seat rings normally contacting a valve gate or closure member reciprocally movable within the chamber 14 (not shown) and ordinarily, but not necessarily, a valve guide means such as the rib 17 may be employed to engage the closure member in the course of its reciprocating movement in opening and closing the valve.

For the reasons above referred to, it becomes frequently necessary to provide this type of valve, having the venturi ports with drain means in order to permit of more efficient pipe line operation, as well as to avoid objectionable water hammer or the like during the course of operating said line.

At this stage, attention is now directed to the construction of the inner walls 6 and 7 of the venturi passages 4 and 5 respectively which form the essence of this invention and specifically reference is made generally to the recess designated 18, which, as more clearly shown in FIG. 3, is recessed as at 19 to form the bottom or floor of the recessed portion 18. It will be noted that connected to the base surface 19 are the oppositely disposed sloping surfaces 21 and 22. As shown more clearly in FIG. 1, the inner end limit of the relieved portion 18 is defined by the sloping surface 23, which it will be noted preferably form a relatively narrow configuration as at 24, expands to the tapered limits at 25 and 26 thereby to form a modified tear-drop design of relieved portion in which the base surface or floor 19 remains substantially uniform in its width throughout its length beyond the surface 23, while the surfaces 25 and 26 gradually converge as at 27 and 28 to a dimension substantially equaling the width of the base surface 19, such convergence occurring at the outer surface 29 forming the face of the flange 3 as indicated.

For convenience in applying drains to said casing in a horizontal pipeline and, as, for example, when the valve stem is either in a vertically disposed position or a horizontal position a plurality of such relieved portions 18 are necessary and, as indicated, with the valve stem in the assumed horizontal position shown in FIG. 1, the lowermost portion as defined by the surface 19 in which the condensate or other fluid being drained from the line preferably flows by gravity therefrom and the usual tape 31 provided with pipe threads for receiving a drain line is provided as indicated. In order that the minimum interference with the desirable flow characteristics of a venturi port are provided, it will be noted that the upper limits of the relieved portion 18 are defined by a pitched surface as at 32 preferably extending from the outer portion of the peripihery as defined by the surface 29 to the annular shoulder as at 33 in continuous unbroken form, thereby tending to stratify the flow rather than to create interference and cause undesirable turbulence in the line flow therepast. On the outside of the casing 1, preferably a boss 34 is provided having a merger with the valve body by means of the annular surface 35 forming the outer configuration of the boss 34. The general dimensions of the boss are indicated with respect to the metal thickness of the valve by the reference to the dotted lines as indicated at 30. It will be noted, particularly in viewing the lower portion of FIG. 1, that the surface 23 defining the inner limits of the relieved portion 18 is preferably pitched or sloped in such manner as to improve the flow characteristic and afford but slight resistance to such flow, and this is true regardless of the direction in which the flow may occur. The valve with the number of drain bosses provided is intended to have such flexibility that there is always convenient installation of the drain available. It should be noted that there is no intention to provide a particular scale or specific proportions of the relief portions to either of the venturi ports 6 or 7 and that depending upon the size of the drain boss employed at 31, which must always be at the lowermost surface in order to effectively function, the width and to some extent the length of the relieved portion 18 is determined. While a number of advantages have been stated as coming from the construction of the relieved portion 18 described, there are other benefits attributed of which mention need not be made at this time.

While attention has been given to the preferred form of relieved area in the venturi port of the vessel under certain conditions, it may be desirable to employ a modified form of relieved area, such as that generally designated 36, in which the relieved portion is provided with the bottom or base surface 37, the width of which is defined by oppositely disposed substantially vertical walls 38 and 39. It will be noted that the depth of the side walls as at 38 and 39 (and also at 21 and 22) will vary as the pitch or slope of the curved wall defining the respective venturi ports. The outer end of the relieved portion as at 41 ends at the flange surface 29. While the inner end portion of the relieved area 36 is defined by an end wall 42 also extending substantially vertically and being of rounded configuration to merge with the respective side walls 38 and 39 as illustrated. In this construction, the function is similar to that described in connection with FIGS. 1 to 3 inclusive, but again may be used simply to meet an unusual condition requiring a special drain. In the same manner as described in connection with FIG. 1, a through drain opening 31 threaded as indicated receives a drain pipe (not shown). In all other respects the performance of this relieved portion 36 will be similar to that described previously and so no further details need be mentioned.

It will now be apparent that a relatively economical and conveniently provided drain for specific use with venturi ported pressure vessels has been accomplished. The arrangement permits of a wide variety of installations in various fields of service without special handling.

While only a pair of embodiments of the invention have been illustrated and described, it will be understood that the manner of exemplifying my invention is capable of being set forth in other modifications falling within the spirit of my invention. It is the desire therefore to be limited only to the extent of the claims appended hereto, interpreted in light of such modifications as may be imposed by the state of the art.

I claim:

1. A pressure vessel comprising a casing having inlet and outlet ports;
   at least one of said ports being provided with a venturi opening characterizing said port;
   drain means for the said venturi port;
   the said drain means consisting of a relieved portion constituting an interior depressed wall surface of said venturi port and extending substantially parallel to the longitudinal axis of said venturi port to the outer end limit of said latter port;
   the said drain means having an opening from the casing venturi port, the inner end limit of said opening interrupting said interior depressed wall surface of the venturi port to communicate with said relieved portion.

2. A pressure vessel comprising a valve casing having inlet and outlet ports defined by flange portions;
   a valve chamber between said ports;
   at least one of said ports being provided with a venturi opening characterizing said port;
   the inner end portion of said venturi being defined by an annular raised portion forming a limit for said valve chamber and the outer end of said venturi terminating at one of said flange portions;
   drain means for the said venturi port;
   the said drain means consisting of a relieved area constituting a depressed wall surface portion of said venturi port and extending substantially parallel to the longitudinal axis of said venturi port to the outer end limit of said latter port;
   the said drain means having an opening extending transversely from the casing venturi port interrupting said depressed wall surface portion whereby to provide an uninterrupted drain passageway from the venturi port.

3. A pressure vessel comprising a casing having inlet and outlet ports;
   at least one of said ports being provided with a venturi opening characterizing said port;
   drain means for the said venturi port;
   the said drain means consisting of a relieved portion constituting a depressed wall surface on the inner periphery of said venturi port and extending substantially parallel to the longitudinal axis of said venturi port to the outer end limit of said latter port;
   the said drain means having an opening transversely extending from the casing venturi port;
   the said relieved portion of the wall surface of said venturi port being defined by tapered side and end walls whereby to facilitate fluid drainage from said latter port.

4. A pressure vessel comprising a casing having inlet and outlet ports;
   at least one of said ports being provided with a venturi opening characterizing said port;
   drain means for the said venturi port;
   the said drain means consisting of a relieved portion constituting a depressed wall surface of said venturi port and extending substantially parallel to the longitudinal axis of said venturi port to the outer end limit of said latter port;
   the said relieved portion defined by the depressed wall surface being of streamline tear drop configuration when viewed in plan;
   the said drain means having an opening from the casing venturi port to provide an uninterrupted drain passageway from said latter port.

5. A gate valve or the like comprising a casing having inlet and outlet ports with a valve chamber therebetween;
   at least one of said ports being provided with a venturi opening characterizing said port;
   the valve chamber having its outer portion defined by an inwardly extending annular rib constituting a seat portion for said valve casing, the rib separating the valve chamber from said venturi port;
   drain means for the said venturi port;
   the said drain means consisting of a relieved portion constituting a depressed wall surface of said venturi port commencing immediately beyond said annular rib and extending substantially parallel to the longitudinal axis of said venturi port to the outer limits of said casing;

the said drain means having an opening extending transversely from the casing venturi port communicating with said relieved wall surface to interrupt at least a portion of said latter surface.

6. A pressure vessel comprising a casing having inlet and outlet ports;

at least one of said ports being provided with a venturi opening characterizing said port;

drain means for the said venturi port;

the said drain means consisting of one or more relieved portions constituting a wall surface of said venturi port and extending substantially parallel to the longitudinal axis of said venturi port;

the said relieved portion being annularly spaced apart in the venturi port to provide continuous depressed surfaces having channels for substantially the length of said venturi port and permitting apertured drains selectively installed at one or more peripheral portions of said venturi port defined by said depressed surfaces;

the said drain means having an opening extending transversely from the casing venturi port to communicate with said flat channels.

7. A pressure vessel comprising a casing having inlet and outlet ports;

at least one of said ports being provided with a venturi opening characterizing said port;

drain means for the said venturi port;

the said drain means consisting of a relieved portion of unequal depth constituting a wall surface of said venturi port and having substantially straight side and end walls;

the side walls extending parallel to the longitudinal axis of said venturi port and being joined by said end wall;

the said drain means having an opening transversely extending from the relieved portion of the casing venturi port.

8. The subject matter of claim 7, the depth of the side walls defining said relieved portion varying as the slope of the said venturi port.

References Cited in the file of this patent

UNITED STATES PATENTS

| | | |
|---|---|---|
| 1,780,525 | Jacobsen | Nov. 4, 1930 |
| 2,293,016 | Dopp | Aug. 11, 1942 |
| 2,918,933 | Boitnott | Dec. 29, 1959 |

FOREIGN PATENTS

| | | |
|---|---|---|
| 445,636 | Great Britain | Apr. 16, 1936 |
| 595,631 | France | July 20, 1945 |
| 523,382 | Canada | Apr. 3, 1956 |